United States Patent [19]
Patterson et al.

[11] Patent Number: 5,430,914
[45] Date of Patent: Jul. 11, 1995

[54] SELF RELEASING SNAP

[75] Inventors: Gregory S. Patterson, Stuart; Mark G. Welsh, West Palm Beach, both of Fla.

[73] Assignee: Turtle Snaps, Inc., Palm Beach Gardens, Fla.

[21] Appl. No.: 69,116

[22] Filed: May 28, 1993

[51] Int. Cl.6 .............................................. A44B 21/00
[52] U.S. Cl. ...................................... 24/598.5; 24/602
[58] Field of Search ................. 24/598.5, 599.5, 599.7, 24/600.2, 601.5, 635, 641, 602, 115 F

[56] References Cited

U.S. PATENT DOCUMENTS

| | | | |
|---|---|---|---|
| 3,014,257 | 12/1961 | Huffman | 24/598.5 |
| 3,171,183 | 3/1965 | Johnston | 24/635 |
| 3,413,692 | 12/1968 | Pressley | 24/602 |
| 3,952,382 | 4/1976 | Vaage | 24/598.5 |

*Primary Examiner*—James R. Brittain

[57] ABSTRACT

A self releasing snap receives and secures an object like a rope, cable or line, and the release of the object by the fastener is in response to a force applied to the opposing fastening end through a second line. The releasing feature is adjustable in reference to the force required on the opposing end to activate the self releasing feature. The self releasing snap may be manually operated to release the object with a lesser force than is required to activate the self releasing feature.

15 Claims, 5 Drawing Sheets

SELF RELEASING SNAP

DESCRIPTION

1. Technical Field

This invention relates to self releasing snaps.

2. Background of the Invention

Releasing snaps of the type wherein one end releases an object when a certain force is applied to the other end to prevent breakage or damage of the snap or attached rope, cable, or line often require a spring means within the snap. Most commonly, a female section of the snap fastens to a mating male portion on the cable, like a cable with a ball end or other mating piece that fits into a female portion of the releasing snap. For example, U.S. Pat. Nos. 602,569 and 3,413,692 describe devices which utilize mating male and female parts which release when they are subjected to an undesirable force.

DISCLOSURE OF INVENTION

It is an object of the present invention to provide a simplified self-contained self releasing snap means.

Another object of this invention is to provide a simplified self-contained self releasing fastener requiring fewer parts for operation, therefore lowering manufacturing costs of the self releasing fastener.

Another object of this invention is the coaxial stacked inner and outer cylinders that allows for a compact final assembly of the releasing fastener.

The foregoing and other objects, features and advantages of the present invention will become more apparent in light of the following detailed description of the preferred embodiments thereof as shown in the accompanying drawings.

BEST MODE FOR CARRYING OUT THE INVENTION

Figure 1:
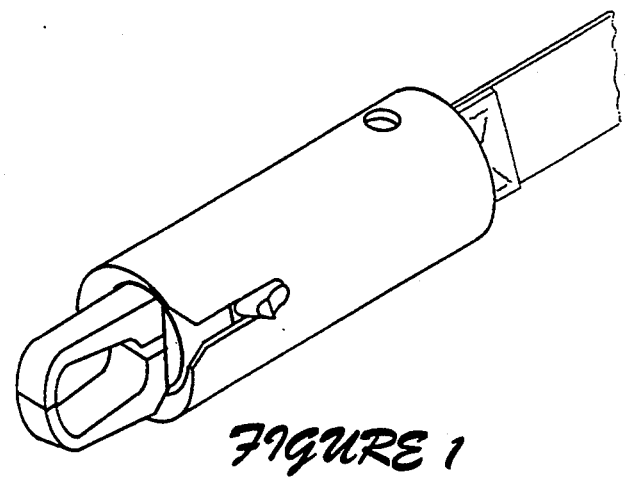
FIG. 1 is a perspective view of the self releasing snap.

Referring to the exemplary embodiments of FIGS. 1, 2, 3, 4, and 5, a self releasing snap according to the present invention is designated by reference numeral 10. The self releasing snap 10 has a first end 12 and a second end 14. A first force is applied to the first end 12 relative to the second end 14 through a strap 16 attached to an inner cylindrical housing pin 18. The inner cylindrical pin 18 is securely fitted to an inner cylindrical housing 20 through an inner cylindrical housing pin opening 22. The inner cylindrical housing 20 has an inner cylindrical housing first opening 24 at the first end 12 and an inner cylindrical housing second opening 26 at the second end 14.

Figure 8:
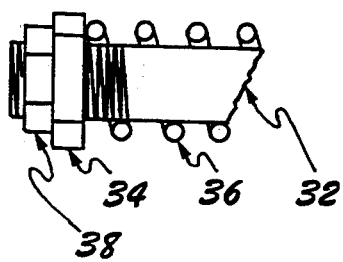
FIG. 8 is a view showing a jam nut placed adjacent to an adjustment nut.

The second end 14 comprises a jaw 28 and a pivot jaw 30. Jaw 28 is attached to a threaded rod 32 positioned inside the inner cylindrical housing 20. The threaded rod 32 has an adjustment nut 34 screwed onto the end of the threaded rod 32 to contain and adjust the tension of an inner compression spring 36 positioned outside of the threaded rod 32 and inside the inner cylindrical housing 20. As shown in FIG. 8, a jam nut 38 may be used adjacent to adjustment nut 34 to restrict movement of the adjustment nut 34. The other end of the inner compression spring 36 rests against an inwardly extending lip 40 at the inner cylindrical second opening 26. The pivot jaw 30 pivots at a first jaw pin 42, which is positioned through the jaw 28.

An outer cylindrical housing 44 is positioned coaxially outside of the inner cylindrical housing 20, the outer cylindrical housing 44 having an outer cylindrical housing first opening 46 at the first end 12 and an outer cylindrical housing second opening 48 at the second end 14. An outer compression spring 50 is positioned outside of inner cylindrical housing 20 and inside of the outer cylindrical housing 44. The outer compression spring 50 pushes against the inner cylindrical housing pin 18 at one end and against an inwardly extending shoulder 52 at the other end. The outer cylindrical housing second opening 48 is sized to allow free motion of the outer cylindrical housing 44 over and along the inner cylindrical housing 20.

When the releasing fastener 10 is at rest, the pivot jaw 30 is forced closed against jaw 28 by the contact of an outer cylindrical housing inner wall 54 against a pivot jaw tapered shoulder 56, which rotates about first jaw pin 42. The contact results from the outer cylindrical housing 44 being forced toward the second end 14 of the fastener 10 relative to the inner cylindrical housing 20 by the outer compression spring 50. The jaw 28 and pivot jaw 30 are maintained securely against the inner cylindrical housing 20 by the inner compression spring 36 and are forced to contact the outer cylindrical housing second opening 48.

The outer cylindrical housing 44 has an outer cylindrical housing assembly opening 58, which is used as an assembly aid to position the inner cylindrical housing pin 18 through the inner cylindrical housing 20.

Figure 2:
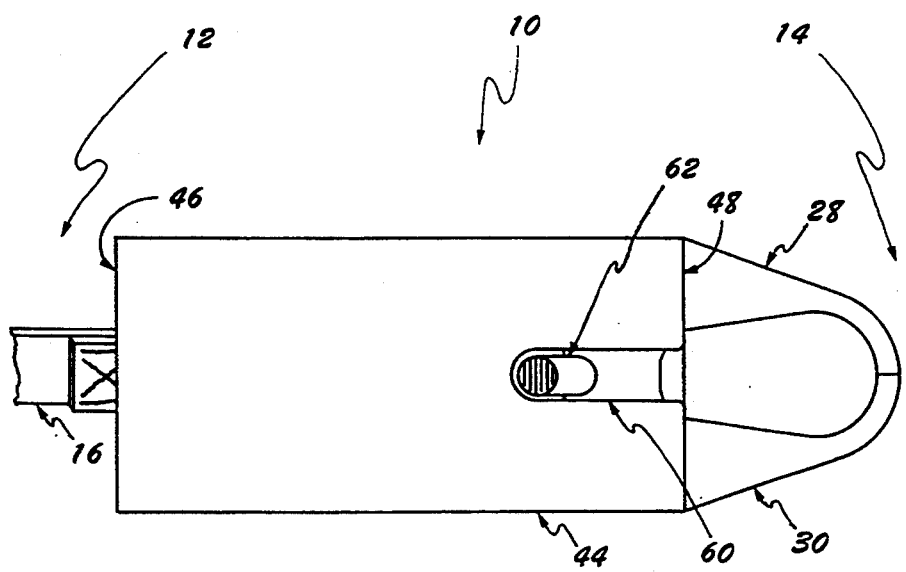
FIG. 2 is a top view of the self releasing fastener as it appears in the normally closed position.
Figure 3:
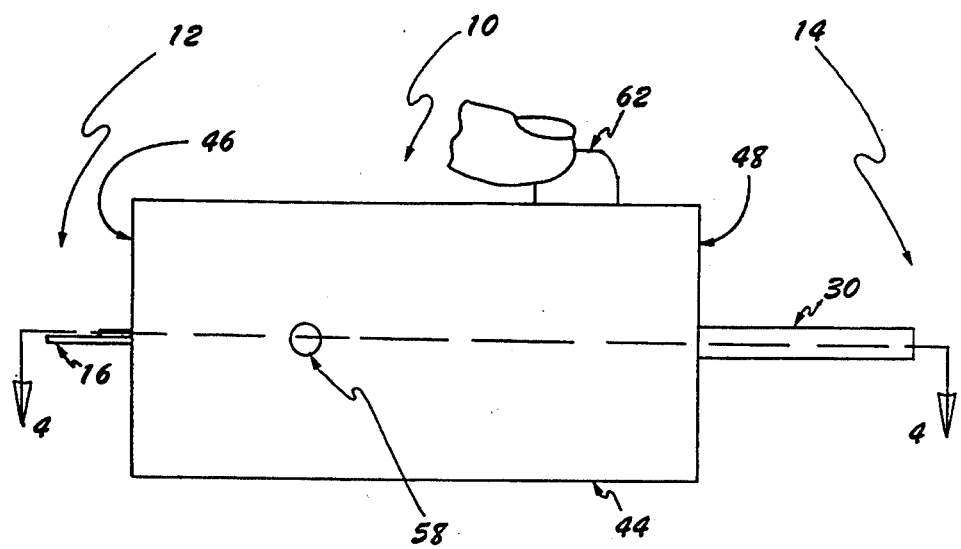
FIG. 3 is side view of the self releasing fastener as it appears in the normally closed position.
Figure 4:
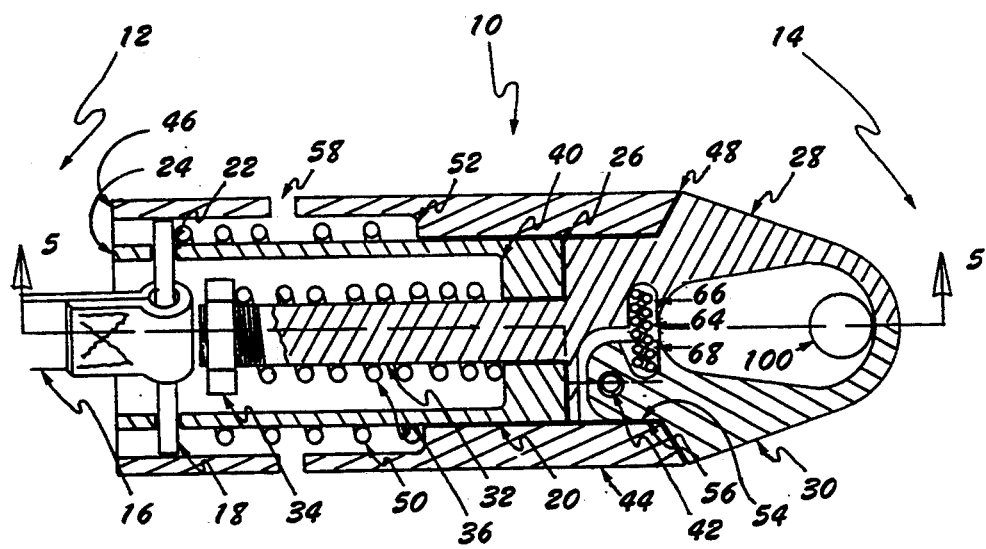
FIG. 4 is a sectional view taken along line 4—4 in FIG. 3 showing the top view of the self releasing fastener as it appears in the normally closed position.
Figure 5:
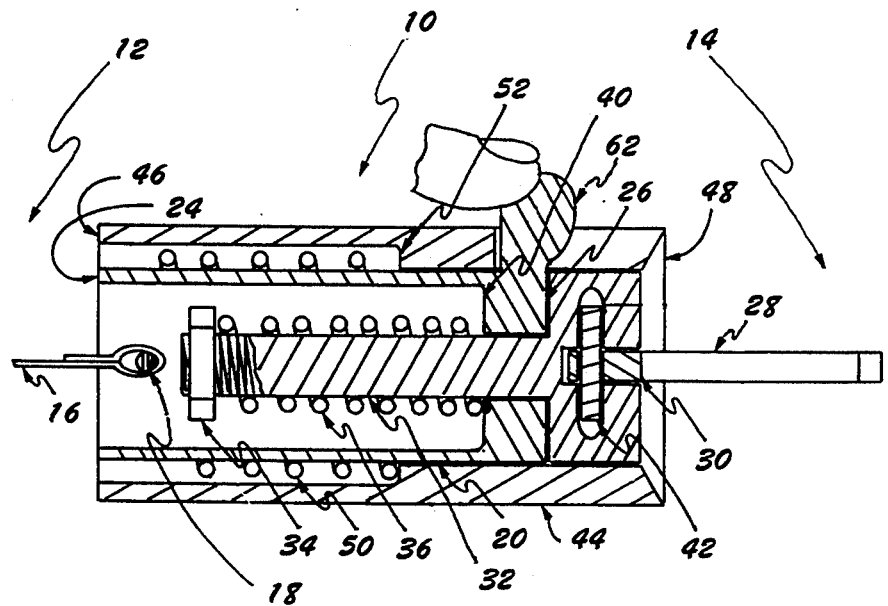
FIG. 5 is a sectional view taken along line 5—5 in FIG. 4 showing the side view of the self releasing fastener as it appears in the normally closed position.
Figure 7:
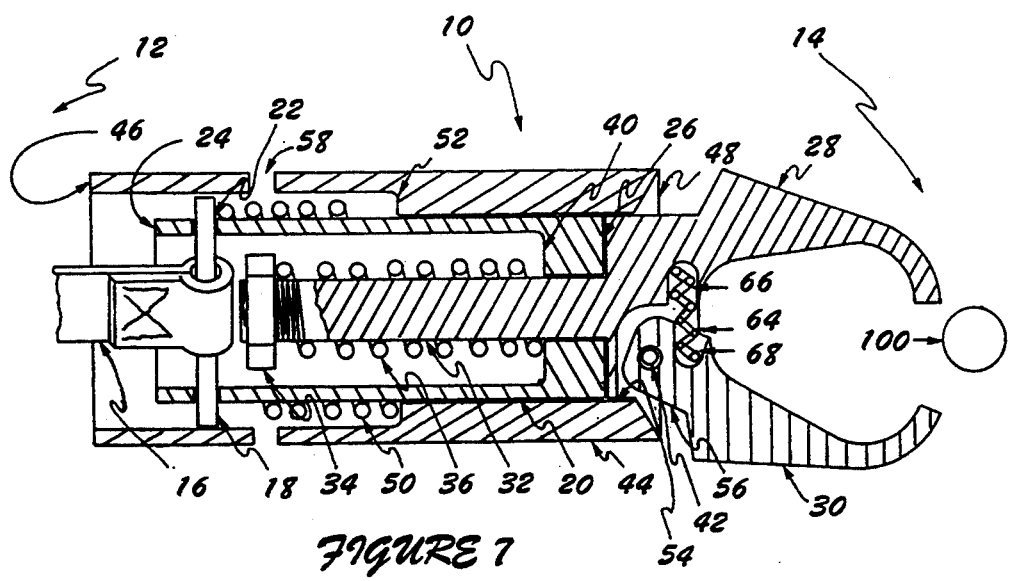
FIG. 7 is a sectional view showing the top view of the self releasing fastener as it appears releasing the object while being manually opened by using a thumbrest.

FIG. 7 illustrates the self releasing snap being opened manually. The outer cylindrical housing 44 has a slot 60, as shown in FIG. 2, to accommodate axial movement of the thumbrest 62 to manually open pivot jaw 30. Thumbrest 62 may be secured to the inner cylindrical housing 20 by any means such as being welded, threaded or cast integrally with the inner cylindrical housing 20. The outer compression spring 50 has less tension than the inner compression spring 36; therefore, the jaws may be manually opened by pushing the thumbrest 62 forward while holding the outer cylindrical housing 44 stationary, which frees the pivot jaw shoulder 56 from contacting the outer cylindrical housing inner wall 54. The pivot jaw 30 is biased open when set free from the outer cylindrical housing 44 by use of a jaw compression spring 64, which is positioned inside a first jaw slot 66 inside of the jaw 28 and a second jaw slot 68 inside of the pivot jaw 30.

Figure 6:
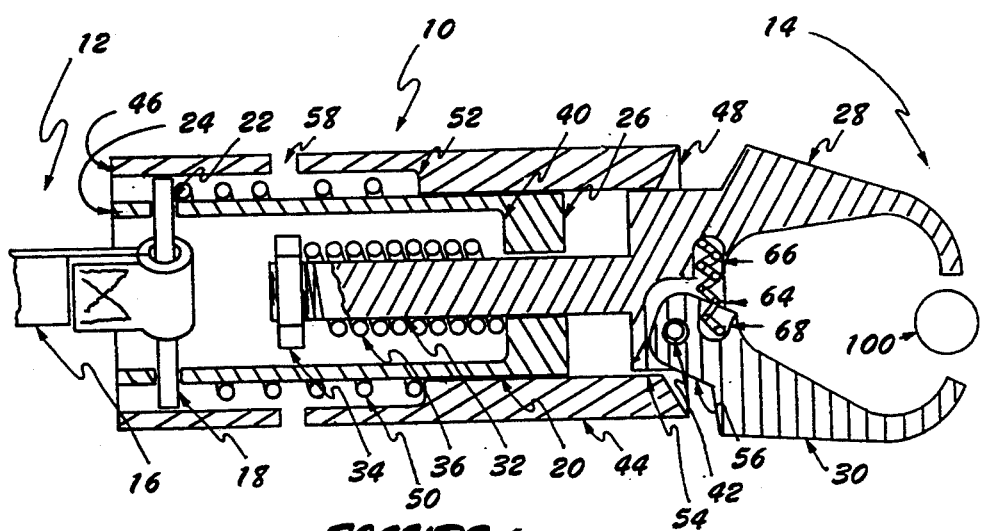
FIG. 6 is a sectional view-showing the top view of the self releasing fastener as it appears releasing an object under force as applied through a sharp.

FIG. 6 illustrates the self releasing snap 10 being activated while under a predetermined load placed upon the inner cylindrical housing pin 18 through strap 16 at the first end 12. Pivot jaw 30 is allowed to open during the self release operation, which frees the object 100 trapped by jaw 28 and pivot jaw 30. The force upon the inner cylindrical housing pin 18 causes the inner cylindrical housing 20 and the inwardly extending lip 40 to move against the inner compression spring 36. As the inner cylindrical housing 20 moves toward the first end 12, the thumbrest 62 contacts the bottom of slot 60 in the outer cylindrical housing 44, which moves the outer cylindrical housing 44 towards the first end 12. The jaw 28 and pivot jaw 30, which have an object 100 trapped, remain closed until contact between the outer cylindrical housing inner wall 54 and the pivot jaw shoulder 56 is no longer maintained. The pivot jaw 30 then opens and releases the object 100 from the fastener 10 and eliminates the reactionary force that caused the fastener 10 to self release. The compressed force of the inner compression spring 36 forces the fastener 10 to automatically return to the closed rest position.

FIG. 8 illustrates the jam nut 38 adjacent to adjustment nut 34, which restricts the movement of adjustment nut 34.

Figure 9:
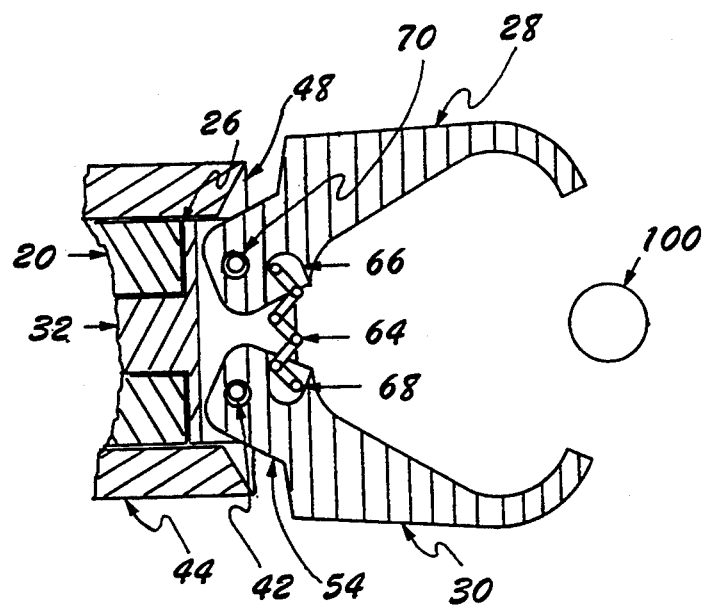
FIG. 9 is a view showing an embodiment which utilizes two pivoting jaws.

FIG. 9 illustrates an embodiment where jaws 28 and 30 both pivot at the first jaw pin 42 and a second jaw pin 70 while being activated to self release object 100.

Figure 10:
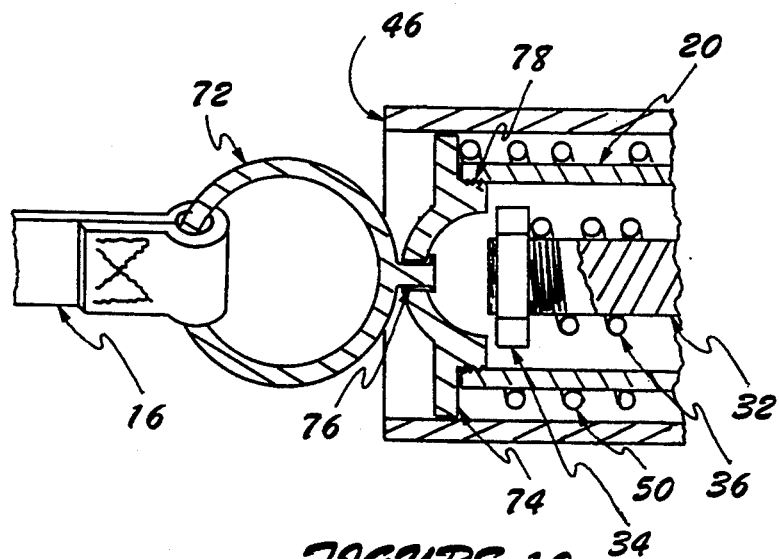
FIG. 10 is a view showing an embodiment where the strap is fastened to a ring, which is secured in an end cap by being threaded to an inner cylindrical housing.

FIG. 10 illustrates the strap 16 fastened to ring 72, which is attached to an end cap 74 by stud 76, which is deformed at the end. The end cap 74 is secured by being threaded to an inner cylindrical housing wall 78 and secures the outer compression spring 50. Ring 72 is free to rotate about end cap 74 at ring stud 76.

Expansion pins may be used for pins 18, 42, and 70 to restrict movement of the pins.

The construction of the self releasing snap may be made with a number of materials that will withstand the forces needed, which depends on the end use, including corrosion resistant alloys and polymers such as stainless steel, titanium, aluminum, zinc, monel alloys, and silicon RTV rubber polyurethane, or any combination thereof. The outer cylindrical housing 44 may be made from a silicon RTV rubber polyurethane material, more commonly known as SILASTIC K, available from Dow Chemical in Midland, Mich. 48686-0997.

Although the invention has been shown and described with respect to a preferred embodiment thereof, it should be understood by those skilled in the art that other various changes and omissions in the form and detail thereof may be made therein without departing from the spirit and scope of the invention.

We claim:

1. An apparatus that has a strap end and a gripping end where said gripping end snaps to an object and said gripping end releases when a first force is applied to said strap end, comprising:

an outer cylindrical housing having an outer cylindrical housing first opening, an outer cylindrical housing second opening, and a slot extending axially from said outer cylindrical housing second opening;

an inner cylindrical housing positioned inside said outer cylindrical housing, where said inner cylindrical housing has an inner cylindrical housing first opening and an inner cylindrical housing second opening, and a thumbrest extending radially beyond said outer cylindrical housing, said inner cylindrical housing second opening having an inwardly extending lip;

said strap end having a strap fastened to an inner cylindrical housing pin positioned in said inner cylindrical housing;

said gripping end having a rod extending into said inner cylindrical housing;

a first spring means positioned inside said inner cylindrical housing and adjacent to said inwardly extending lip on said inner cylindrical housing second opening and adjacent to said gripping end, where said first spring means absorbs said first force when applied to said strap end so that said thumbrest moves said outer cylindrical housing to free said gripping end and said object;

a second spring means positioned inside said outer cylindrical housing and outside said inner cylindrical housing, where said second spring means absorbs a second force applied to said outer cylindrical housing to manually open said gripping end and free said object.

2. The apparatus of claim 1 wherein said gripping end has a spring means to bias the gripping end open.

3. The apparatus of claim 2 wherein said gripping end comprises a first jaw that is fixed to said rod and a second jaw adjacent to said rod, where said second jaw pivots at a jaw pin positioned through said first jaw.

4. The apparatus of claim 3 wherein said rod of said gripping end has a means for adjusting the tension of said first spring means.

5. The apparatus of claim 4 wherein said means for adjusting the tension of said first spring means comprises a threaded portion on said rod and am adjusting nut adjacent to said first spring means.

6. The apparatus of claim 5 wherein said second spring means is positioned adjacent to an inwardly extending shoulder from said outer cylindrical housing and adjacent to the inner cylindrical housing pin.

7. The apparatus of claim 6 wherein said first force applied to said strap end is applied to said strap.

8. The apparatus of claim 4 wherein a jam nut is placed next to said adjusting nut.

9. The apparatus of claim 8 wherein said apparatus is made of stainless steel, titanium, aluminum, zinc, or monel alloys, or silicone RTV polymers.

10. The apparatus of claim 8 wherein a line is attached to the strap end.

11. The apparatus of claim 8 wherein the pins used are expansion pins.

12. The apparatus of claim 11 wherein said jaws each have jaw pins and pivot about said jaw pins.

13. The apparatus of claim 1 wherein an end cap is used to restrain said second spring means and said end cap is fastened into said inner cylindrical housing at an inner cylindrical housing wall;

a ring is secured at said end cap through a stud;

said strap is fastened to said ring.

14. An apparatus having a first jaw and a second jaw, said jaws used for restraining an object, comprising:

an outer cylindrical housing having an outer cylindrical housing first opening, an outer cylindrical housing second opening, and a slot extending axially from said outer cylindrical housing second opening, said outer cylindrical housing second opening having an inwardly extending shoulder and an outer cylindrical housing inner wall;

an inner cylindrical housing having an inner cylindrical housing first opening, an inner cylindrical housing second opening, an inner cylindrical housing pin fastened to said inner cylindrical housing, and a thumbrest extending radially beyond said outer cylindrical housing, said inner cylindrical housing second opening having an inwardly extending lip, said inner cylindrical housing positioned inside said outer cylindrical housing;

a strap attached to the inner cylindrical housing pin;

a threaded rod extending into said inner cylindrical housing through said inwardly extending lip, said rod adjacent to said jaws, the rod having an adjustment nut engaging said threads;

an inner cylindrical spring positioned inside said inner cylindrical housing and outside said rod, said inwardly extending lip and said adjustment nut containing said inner cylindrical spring, said inner cylindrical spring absorbing a first force when applied to said strap;

an outer cylindrical spring positioned inside said outer cylindrical housing and outside said inner cylindrical housing, said inwardly extending shoulder and said inner cylindrical housing pin containing said outer cylindrical spring;

a jaw spring positioned between said jaws biasing said jaws open, said second jaw having a pivot pin and a pivot jaw shoulder so that said outer cylindrical housing inner wall contacts said second pivot jaw shoulder forcing said first jaw and said second jaw together when said apparatus is at rest and so that said second jaw pivots in relation to the first jaw when said first force is applied to said strap applying tensile stress to said apparatus and said inner cylindrical housing spring yields to said first force and said thumbrest moves said outer cylindrical housing away from said jaws so that said second jaw pivots away from said first jaw and said object is released;

said outer cylindrical spring absorbing a second force when said second force is applied to said outer cylindrical housing to manually open said jaws.

15. The apparatus of claim 14 wherein said jaws each have jaw pins and pivot about said jaw pins.

* * * * *